US010987861B2

United States Patent
Guo et al.

(10) Patent No.: US 10,987,861 B2
(45) Date of Patent: Apr. 27, 2021

(54) HIGH-PRECISION MANUFACTURING MACHINE

(71) Applicants: Jing Guo, Toronto (CA); Zhuo Wei, Markham (CA)

(72) Inventors: Jing Guo, Toronto (CA); Zhuo Wei, Markham (CA)

(73) Assignee: Dimension Tech Incorporated, Markham (CA)

( * ) Notice: Subject to any disclaimer, the term of this patent is extended or adjusted under 35 U.S.C. 154(b) by 139 days.

(21) Appl. No.: 16/075,535

(22) PCT Filed: Feb. 2, 2017

(86) PCT No.: PCT/CA2017/050118
§ 371 (c)(1),
(2) Date: Aug. 3, 2018

(87) PCT Pub. No.: WO2017/132767
PCT Pub. Date: Aug. 10, 2017

(65) Prior Publication Data
US 2019/0047099 A1    Feb. 14, 2019

Related U.S. Application Data

(60) Provisional application No. 62/292,103, filed on Feb. 5, 2016.

(51) Int. Cl.
*B29C 64/20*    (2017.01)
*B29C 64/209*    (2017.01)
*B33Y 30/00*    (2015.01)
*B23Q 3/155*    (2006.01)
*B29C 64/118*    (2017.01)

(52) U.S. Cl.
CPC ............ *B29C 64/20* (2017.08); *B29C 64/209* (2017.08); *B23Q 2003/155418* (2016.11); *B23Q 2003/155449* (2016.11); *B29C 64/118* (2017.08); *B33Y 30/00* (2014.12)

(58) Field of Classification Search
CPC ..... B29C 64/20; B29C 64/118; B29C 64/209; B33Y 30/00; B23Q 2003/155418; B23Q 3/15506; B23Q 2003/155449
See application file for complete search history.

(56) References Cited

U.S. PATENT DOCUMENTS

2006/0156978 A1*  7/2006  Lipson .................... A61L 27/44
                                                  118/708
2015/0140145 A1*  5/2015  Schmehl ............... B29C 64/112
                                                  425/3

(Continued)

*Primary Examiner* — Joseph S Del Sole
*Assistant Examiner* — Jerzi H Moreno Hernandez (57) ABSTRACT

A high-precision manufacturing machine used in precision manufacturing processes, such as a 3-D printer, is described. The machine has a frame, a movable platform supported by and movable relative to the frame, on which are mounted one or more platform tool holders for holding one or more tools such as an extruder, a base station that may include one or more bays, each of the bays having a number of base station tool holders, for storing tools that are not in use, and a supporting base, which may be movable relative to the frame, for holding one or more work items to be processed by the tool or tools selected and held by the movable platform.

11 Claims, 8 Drawing Sheets

(56) References Cited

U.S. PATENT DOCUMENTS

| | | | |
|---|---|---|---|
| 2015/0174824 A1* | 6/2015 | Gifford | B29C 64/20 |
| | | | 425/183 |
| 2016/0135493 A1* | 5/2016 | Kuo | B29C 64/106 |
| | | | 426/231 |
| 2016/0136893 A1* | 5/2016 | Chang | B29C 31/04 |
| | | | 425/150 |
| 2016/0229121 A1* | 8/2016 | Ilic | B29C 64/259 |
| 2017/0190108 A1* | 7/2017 | Holland | B33Y 10/00 |
| 2017/0246801 A1* | 8/2017 | Stodder | B29C 64/336 |
| 2017/0266876 A1* | 9/2017 | Hocker | B33Y 30/00 |

\* cited by examiner

HIGH-PRECISION MANUFACTURING MACHINE

FIELD OF INVENTION

The invention relates generally to the field of precision manufacturing. In particular, the invention relates to a high-precision manufacturing machine used in precision manufacturing processes.

BACKGROUND OF INVENTION

In a high precision processing machine, many different tools may be required to process/manufacture a work item. For example, to manufacture a work item through an additive manufacturing process (or three-dimensional printing process), multi-color and multi-material extruder assembly is often required. There have been proposals to combine more than two or three colors or materials in a single extruder assembly. However, combining multiple extruders into one unit tends to increase printer size. It may require additional cooling to overcome the excessive heat generated by the crowded extruders, too. Combining many extruders into one single unit also can increase maintenance cost, as failure of one extruder may require replacement of the entire extruder assembly. It is also difficult to combine different tools, e.g., an extruder and a laser engraving tool, into a single multi-function machine.

The forgoing creates challenges and constraints in providing a high-precision manufacturing machine, such as a 3-D printer or a high-precision multi-function machine. There is therefore a need for an improved high-precision manufacturing machine as compared to the existing art. It is an object of the present invention to mitigate or obviate at least one of the above mentioned disadvantages.

SUMMARY OF INVENTION

The present invention is directed to a high-precision manufacturing machine. In particular, the invention relates to a high-precision manufacturing machine that supports the use of a large number of printer head or tools without crowding the work area. Broadly speaking, the high-precision manufacturing machine includes a movable platform that holds and carries one or more tool holders. As the platform moves relative to the frame of the high-precision manufacturing machine, a tool held by a tool holder also moves relative to the frame, and hence, a workpiece, for manipulating or processing the workpiece as desired or as required.

The high-precision manufacturing machine also includes a base station having mounted thereon one or more base tool holders. A transportation and engagement mechanism enables the movable tool holder to pick the required tool or tools from the base station to manipulate the workpiece and return the tool or tools to the base station after use, so that no unused tools remain on the movable platform (or as less as possible such unused tools are left on the movable platform), to keep the movable platform less crowded. As a result, the number of available tools is not unnecessarily limited by the limited space available at the movable platform.

In one aspect of the invention, there is provided a high-precision manufacturing machine, which comprises a frame, a movable platform supported by the frame, the movable platform having one or more platform tool holders, each of the one or more platform tool holders having a platform engagement half that cooperates with a complementary tool engagement half of a tool for releasably securing the tool to the movable platform; and a base station, the base station having one or more tool bays mounted on the frame, each of the tool bays having a plurality of base tool holders, each of the base tool holders having a bay engagement half cooperating with the tool engagement half of a tool for releasably storing the tool.

The machine may optionally include a base supported by the frame for holding a work item. Further, as an option, the base is movable relative to the frame.

As another feature, the tool has a set of tool electric contacts, the platform tool holder has a set of platform holder contacts, and the base tool holder has a set of base electric contacts, wherein the set of tool electric contacts and the set of platform holder contacts form a set of platform electric connections when the tool is held by the platform tool holder and the set of tool electric contacts and the set of base holder contacts form a set of base electric connections when the tool is held by the base tool holder.

As yet another feature, the tool is configured as an extruder and the machine is a 3-D printer. As a further feature, the set of base electric connections enables the extruder to be pre-heated when the extruder is held by the base tool holder.

In other aspects the invention provides various combinations and subsets of the aspects described above.

BRIEF DESCRIPTION OF DRAWINGS

For the purposes of description, but not of limitation, the foregoing and other aspects of the invention are explained in greater detail with reference to the accompanying drawings, in which.

DETAILED DESCRIPTION OF EMBODIMENTS

The description which follows and the embodiments described therein are provided by way of illustration of an example, or examples, of particular embodiments of the principles of the present invention. These examples are provided for the purposes of explanation, and not limitation, of those principles and of the invention. In the description which follows, like parts are marked throughout the specification and the drawings with the same respective reference numerals.

Figure 1:
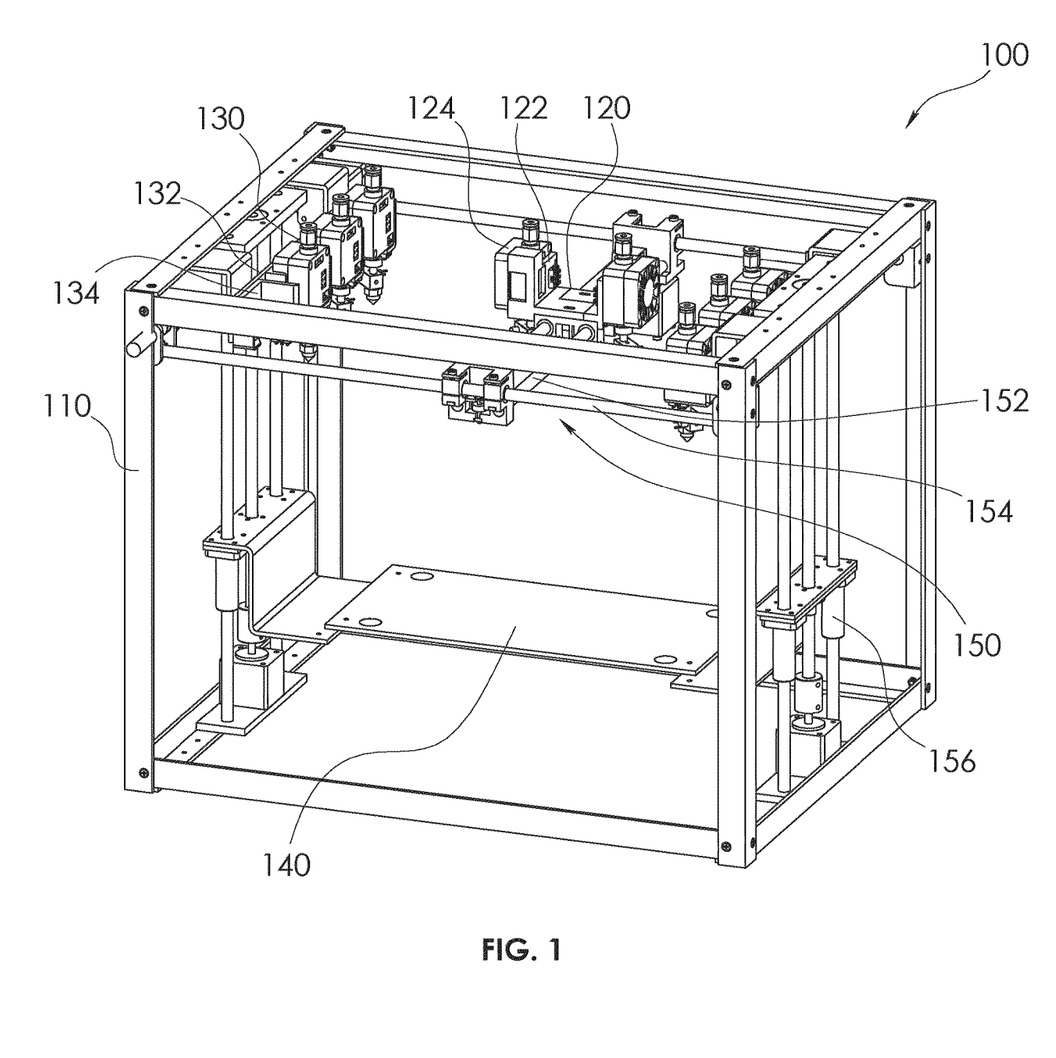
FIG. 1 is an isometric view of an example of a high-precision manufacturing machine according to the present invention.

The present invention relates generally to a high-precision manufacturing machine used in precision manufacturing processes. As illustrated in FIG. 1, the machine 100 has a frame 110, a movable platform 120 supported by and movable relative to the frame 110, on which are mounted one or more platform tool holders 122, each for holding a tool 124 such as an extruder, a base station 130, that may include one or more bays 132, each bay having a number of base station tool holders 134, for storing tools 124 that are not in use, and a supporting base 140, which may be movable relative to the frame 110, for holding one or more work items (not shown) to be processed by the tool or tools held by the movable platform 120.

The machine 100 can be used in any suitable precision manufacturing process provided the appropriate tool 124 is selected. For example, the tool 124 may be a liquid dispensing device (i.e., extruder) for a three-dimensional printer (3-D printer) and the machine 100 may be adapted to be employed as a 3-D printer. Or, the tool 124 may be a laser engraving tool, and the machine 100 may be adapted to be employed as a laser engraving workstation. As yet another alternative, the tool 124 may be a machining tool such as a high speed drill and the machine 100 may be adapted to be employed as a computerized numerical control (CNC) machine tool. The tool also may have its attachments (not shown), such as connections for extrusion liquid materials, electric cables for high speed drill, among others. In the description, when reference is made to a particular type of machine, it is only for convenience. It will be understood that the description is not to be limited to that particular type unless the context so requires. It will also be appreciated that tools 124 stored at the base station 130 may not necessarily be the same type. For example, a base station may store both a 3-D printer extruder and a laser engraving tool, and thus the machine may be adapted as a multi-function machine, both for 3-D printing and for laser engraving.

Frame 110 provides support for various components attached or mounted thereto. It may take any suitable or desirable shape or configuration, for providing the support function. Movable platform 120 is supported by and movable relative to the frame 110. One or more platform tool holders 122 are mounted on or forming integral part of the movable platform. Each of the platform tool holders 122 is for selecting and holding a tool 124, such as an extruder or a laser cutting tool. When the movable platform 120 is moved relative to the frame 110, the tool 124 held by the platform tool holder 122 is carried by the movable platform and relocated to a different position relative to the frame. Thus, movable platform enables the tool 124 to be relocated to another position relative to the frame. This is useful, for example, to re-position the tool relative to a work item held on supporting base 140, for processing or manufacturing a different portion of the work item, or to move the tool to a base station tool holder 134 for returning the tool and selecting a different tool.

Any suitable means may be used for supporting the movable platform and for moving the movable platform relative to the frame. For example, the movable platform 120 may be attached to a robotic arm mounted on the frame and controlled by an automation control system, to relocate the movable platform to any location as directed by such an automation control system. FIG. 1 illustrates a track or rail transport mechanism for supporting and relocating the movable platform 120 as another example. However, any suitable support and transport mechanism may be used for the support and relocation function, and is not limited to any particular examples, including these two examples here.

Referring to FIG. 1, there is illustrated a particular example of a support and transport mechanism 150. A first support bar or first track 152 is movably mounted to a second support bar or second track 154. The first support bar 152 (x-bar) is movable along the length of the second support bar 154 (y-bar). The movable platform 120 is mounted on, and movable along the length of, the first support bar 152. The second support bar 154 (y-bar) is mounted to the frame. Although references are made to a first support bar or a second support bar, it will be appreciated that the "x-bar" may comprises several parallel rods, tracks, rails or bars etc for guiding the movement of the movable platform along a first direction (which will be called "x-direction") and the "y-bar" may similarly comprise several parallel rods, tracks, rails or bars etc for guiding the movement of the movable platform along a second direction (which will be called "y-direction"), that is not parallel with and may be conveniently selected to be perpendicular to the first direction.

When both the first support bar 152 (x-bar) and the second support bar 154 (y-bar) are straight bars, each of the x-bar and the y-bar defines respectively an x-direction and a y-direction, and together, they define an x-y plane, parallel to which the tool 124 moves (of course, more generally, if neither the first support bar 152 nor the second support bar 154 is straight, then the first support bar 152 and the second support bar 154 together may define a curved surface, parallel to which the tool 124 moves). The y-bar 154, or second support bar 154, may be stationarily mounted on the frame 110, in which case the movable platform 120 (and by extension the tool 124 held thereto) moves in a plane parallel to the plane defined by the first support bar 152 and the second support bar 154. The y-bar 154 may also be movably mounted on the frame 110, for example, movable relative to the frame, along a z-direction that is perpendicular to both the x-direction and the y-direction. This will enable the relocation of the movable platform 120 (and by extension the tool 124 held thereto) to another position in a three-dimensional space. Thus, the movable platform can have three translational degrees of freedom and is movable in a 3-dimensional space ("3-D space"). Of course, the movable platform 120 or the platform tool holder 122 may also be movable relative to the first support bar 152, to enable the three-dimensional relocation of the tool 124 held thereto. Additionally, the supporting base 140 may be mounted to a base transport mechanism 156, such as illustrated in FIG. 1, that can move the supporting base 140 along the z-direction up or down (or more generally a direction that is not parallel to the plane defined by the x-bar 152 and the y-bar 154). This also will enable the tool 124 to be relocated to a different location relative to the work item in 3-D space.

Figure 2A:
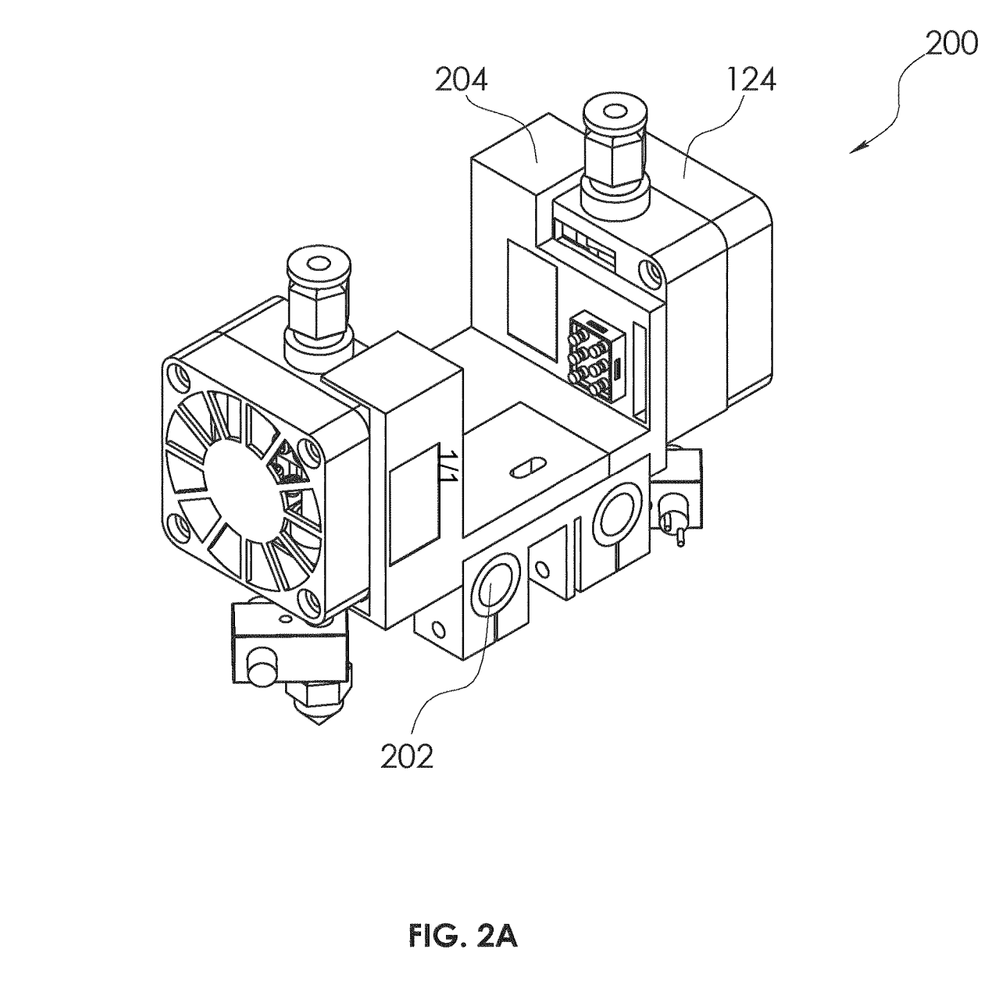
FIG. 2A is an isometric view showing in more detail a movable platform of the machine of FIG. 1.
Figure 2B:
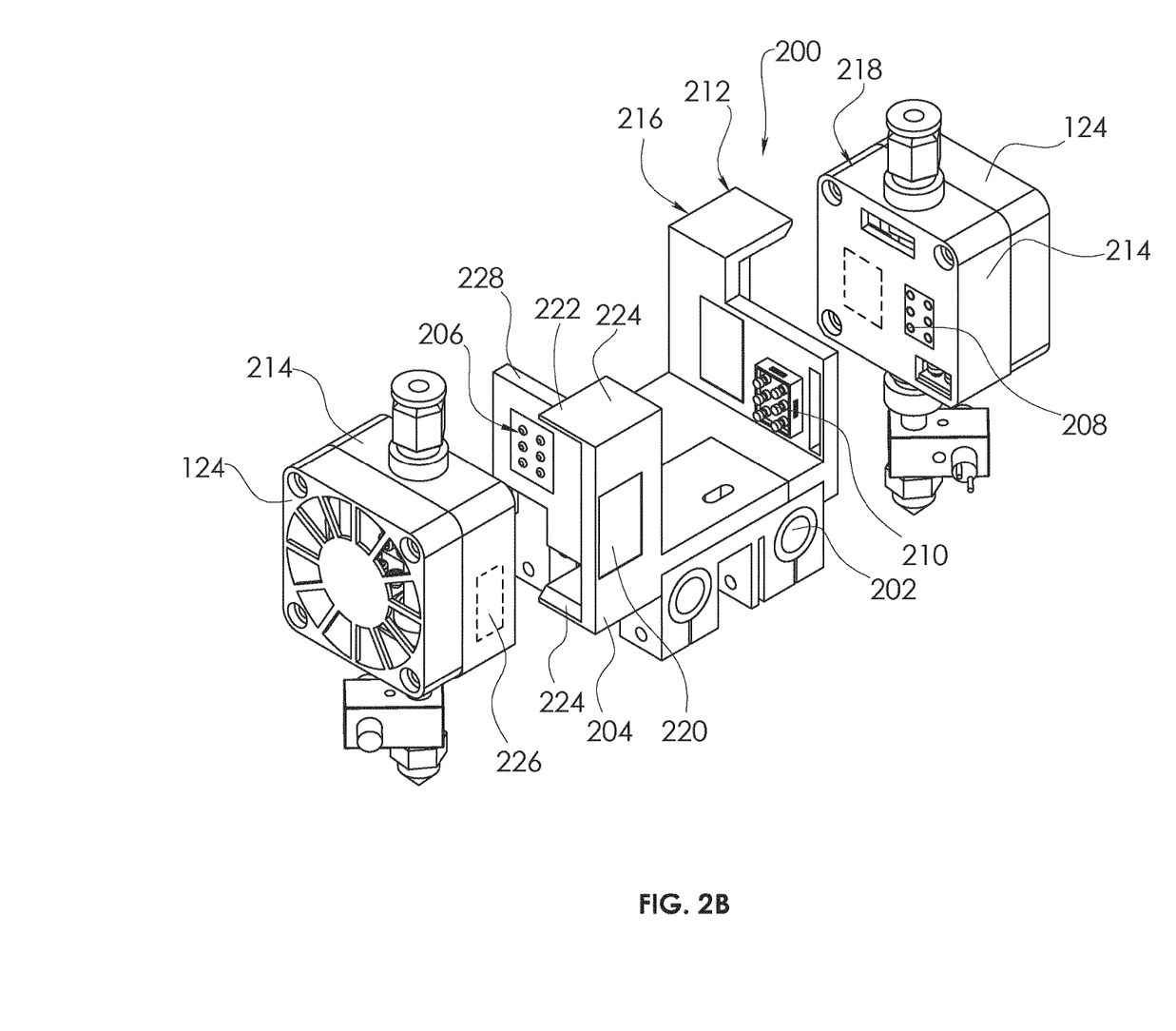
FIG. 2B shows the movable platform of FIG. 2A in an exploded isometric view.

Referring to FIG. 1 and FIG. 2 (i.e., FIG. 2A and FIG. 2B), a movable platform 120 such as an extruder hand 200, adapted for use in a 3-D printer, is illustrated. Extruder hand 200 has a pair of throughholes 202 for movably mounting the extruder hand 200 on the first support bar 152 (or x-bar 152). The size of the throughhole 202 is such that the movable platform can freely move along the x-bar 152, yet the tolerance of the throughholes is so small so that precise positioning of the movable platform can be obtained. The movable platform 120 or extruder hand 200 shown in FIG. 2 has mounted or formed thereon two tool holders, or extruder tool holders 204, each for holding an extruder tool, or extruder 124. As will be appreciated, the number of extruder tool holder provided on a movable platform is not limited to exactly two, and may be only one or more than two, if the design so requires.

Each extruder tool holder 204 has a set of electric contacts, or platform electric contacts 206. The extruder 124 has a set of electric contacts, or tool electric contacts 208. At least a portion of tool electric contacts 208 correspond to some tool electric contacts, so that when the extruder 124 is held by the extruder tool holder 204, as shown in FIG. 2A, the set of tool electric contacts 208 and the set of the tool electric contacts 208 (or the portion thereof) form a set of electric connections, such that electric wires (not shown) connected to the platform terminals 210 of the platform electric contacts 206 become electrically connected to the wires that is internally connected to the set of tool electric contacts 208 (or the portion thereof). This enables control data or signals, for example, to be sent to the extruder 124. This also enables provision of electric power to the extruder 124, when required, to heat the extruder 124 or the extruding liquid injected through the extruder 124, for example.

An engagement arrangement 212 is provided on extruder tool holder 204 and housing 214 of extruder 124 so that extruder 124 may be held by extruder tool holder 204 by the engagement arrangement and detached from the extruder tool holder 204 when required. The extruder tool holder 204 has a first half 216 of the engagement arrangement 212 and the tool's housing 214 has the second and complementary half 218 of the engagement arrangement 212. The first and second halves of the engagement arrangement 212 cooperate to releasably hold the extruder 124 to the extruder tool holder 204, as further described below.

Figure 3:
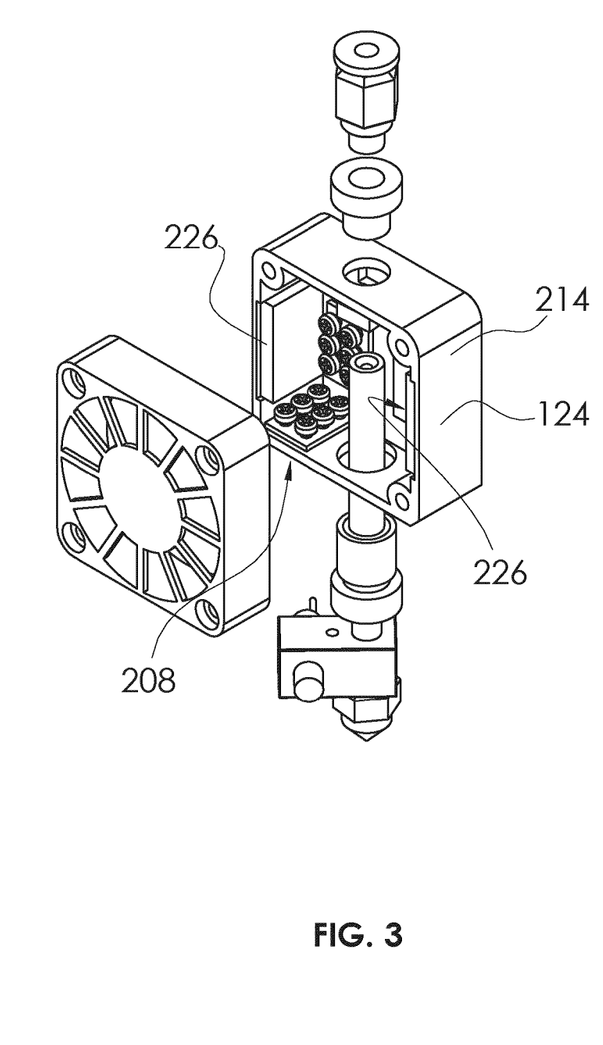
FIG. 3 shows in an exploded isometric view an extruder that can be held to the moveable platform of FIG. 2A.

Referring to FIG. 2B, the first half 216 of the engagement arrangement 212 provided on the extruder tool holder 204 has embedded magnets 220 and a pair of claws 222, such as the pair of facing upper and lower walls 224. The housing 214 of extruder 124 has matching magnets 226 attached to its walls (see FIG. 3 for an exploded view illustrating magnets to be attached to the interior of three walls of the housing 214). Matching magnets 226 of the housing 214 attract to and engage with the embedded magnets 220 of the extruder tool holder 204 when the housing 214 is pushed against the side wall 228 of the extruder tool holder 204 and received between the claws 222, i.e., between the upper and lower walls 224. The size of the housing and the distance between the upper and lower walls 224 are such that the housing 214 can be freely or frictionally pushed into the claws 222 and held there but without much free play so as to wiggle between the claws 222. The magnets ensure that the housing 214 (and therefore the extruder 124) is securely attached to or held by the extruder tool holder 204. On the other hand, magnet strength is suitably selected such that the strength is not exceedingly strong. This allows extruder 124 to be pulled out of claw 222 along a removal direction away from the base wall 230, thus, detached from the extruder tool holder 204. Thus, the first and second complementary halves comprising the magnets and claws cooperate with each other such that they can securely hold the extruder 124 to the extruder tool holder 204 and also permit an extruder 124 held to the extruder tool holder 204 to be detached therefrom.

Figure 4A:
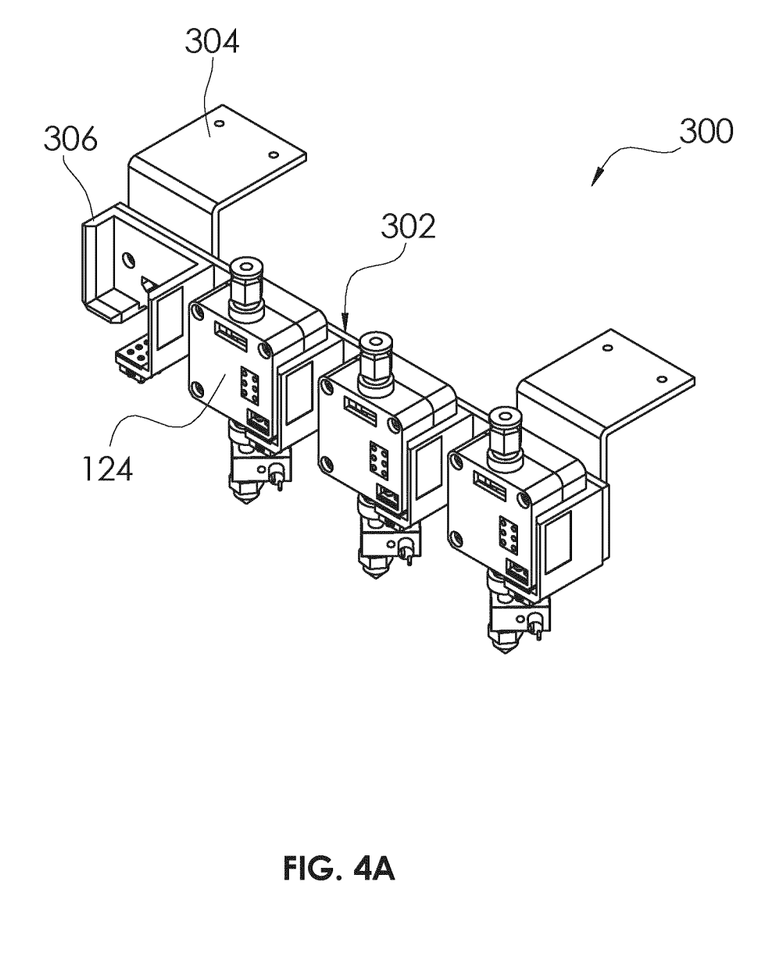
FIG. 4A is an isometric view of a base station of the machine of FIG. 1, having stored several extruders of FIG. 3.

Referring to FIG. 1 again, the machine 100 has a base station 130 for storing tools 124 that are not in use, i.e., not selected and attached to platform tool holders 122. Depending on the needs or design, base station 130 may comprise one or more bays 132 mounted to the frame 110. Referring to FIG. 4A, there is illustrated an example of a bay, in the nature of an extruder station 300. Extruder station 300 has a station platform 302. A pair of L-shaped connectors 304 attach the station platform 302 to the frame 110. A number of base station tool holders 134, e.g., extruder station tool holders 306, are mounted on the station platform 302, for releasably holding, i.e., for storing, extruders 124 not in use.

Figure 4B:
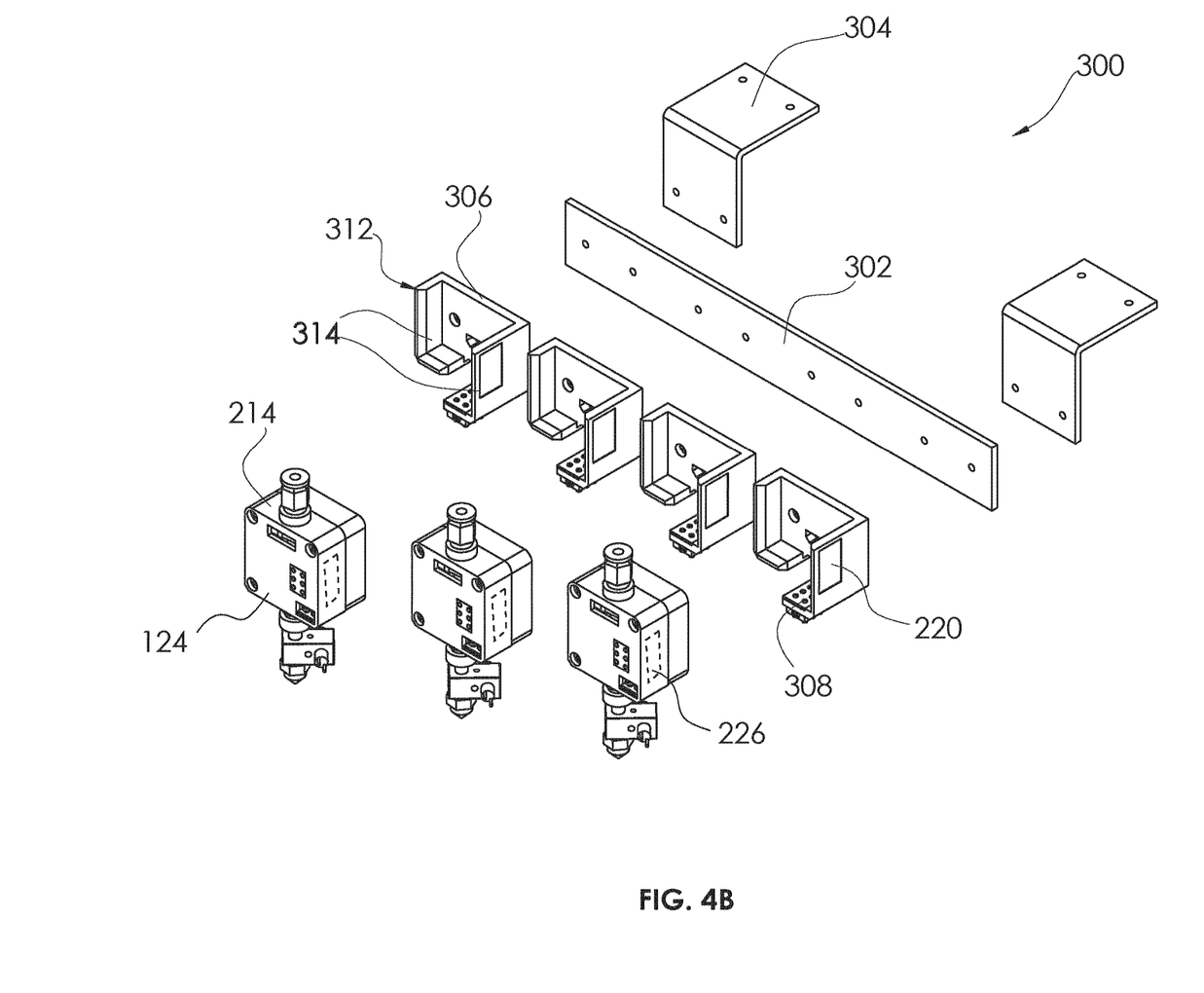
FIG. 4B shows the base station of FIG. 4A in an exploded isometric view.

Referring to FIG. 4B, each of the extruder station tool holders 306 also has a set of station electric contacts 308. At least a portion of tool electric contacts 208 correspond to some of the station electric contacts (see FIG. 3). When the extruder 124 is held by the extruder station tool holder 306, as shown in FIG. 4A, the set of station electric contacts 308 on holder 306 and the set of the tool electric contacts 208 (or the portion thereof) on housing 214 of extruder 124 form a set of electric connections between electric contacts 308 and electric contacts 208. This enables provision of electric power to the extruder 124 to pre-heat the extruder 124 when stored in a base station.

As illustrated more clearly in FIG. 4B, another engagement arrangement 312 is provided on extruder station tool holder 306 and housing 214 of extruder 124. This enables extruder 124 to be releasably held by extruder station tool holder 306. Similar to the engagement arrangement 212 (provided on the extruder tool holder 204 and the tool's housing 214), the second engagement arrangement 312 also has a first half, but is provided on the extruder station tool holder 306, and a second and complementary half, which is provided on the tool's housing 214. The first and second halves of the second engagement arrangement 312 similarly cooperate to releasably hold the extruder 124 to the extruder station tool holder 306.

As can be seen in FIG. 4B, the first half provided on the extruder station tool holder 306 has embedded magnets 220 and a pair of claws, such as a pair of upright walls 314. The magnets 226 attract to and engage with matching magnets 226 of the housing 214 when the housing 214 is pushed against and received in the extruder station tool holder 306. The size of the housing and the distance between the upright walls 314 are such that the housing 214 can be freely or frictionally pushed into the space between the upright walls 314 and held there but without much free play so as to wiggle between upright walls 314. The magnets ensure that the housing 214 (and therefore the extruder 124) is securely attached to or held by the extruder station tool holder 306.

As described, unlike the first half of the engagement arrangement 212 provided on the extruder tool holder 204, the pair of claws of the second engagement arrangement 312 are formed from a pair of upright walls 314. Thus, instead of sliding sideways to move the tool's housing 214 out of the claws of the engagement arrangement 212 (see FIG. 2B), the housing of the extruder 124 can be detached from the claws of the second engagement arrangement 312 by lifting, i.e., removed out of the pair of upright walls 314, in a general upward direction. In general, the direction along which to remove the housing out of the claws of the engagement arrangement 212 is not parallel with the direction along which to remove the housing from the claws of the second engagement arrangement 312.

Figure 5:
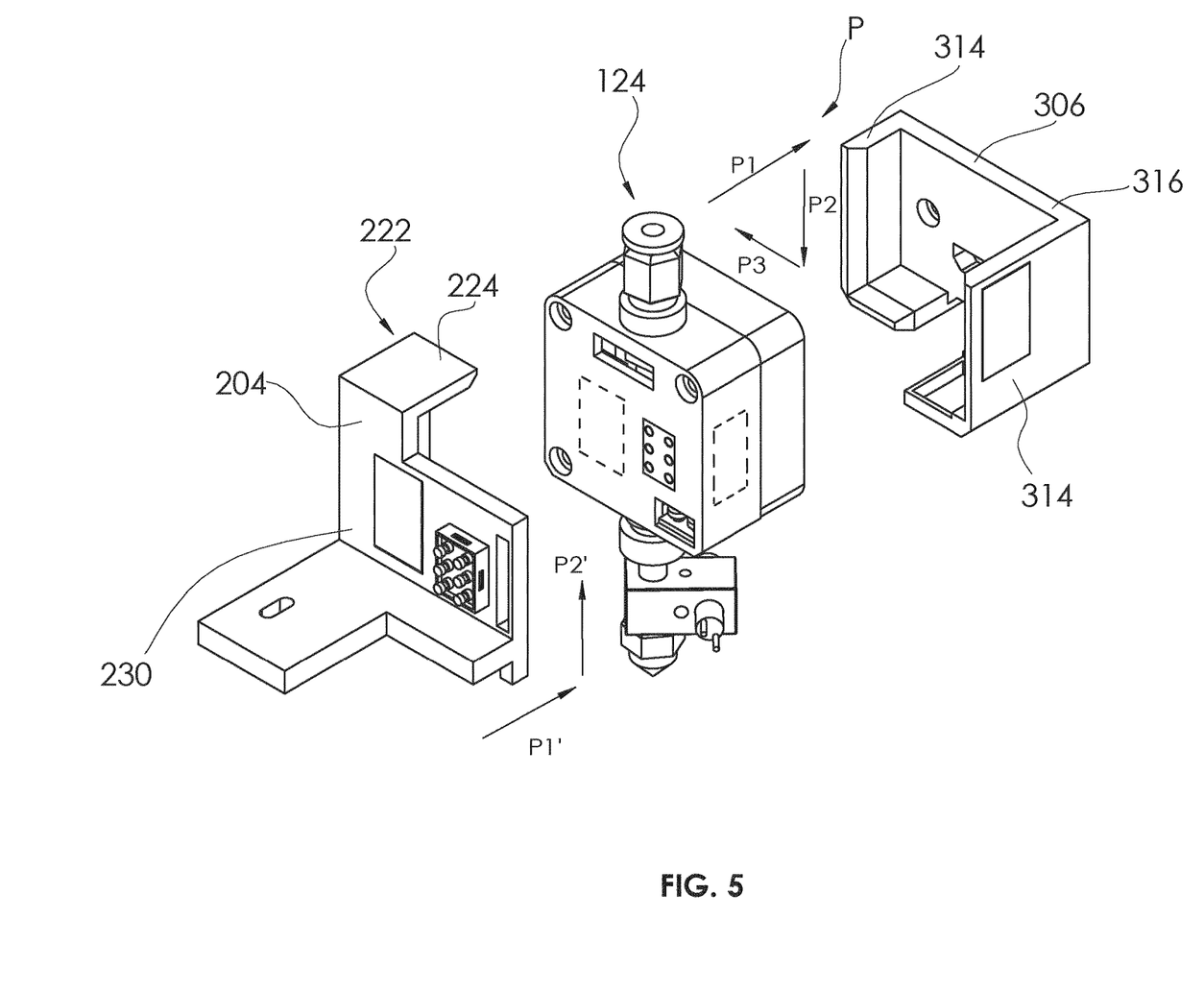
FIG. 5 illustrates an extruder engaging with and detaching from either of the platform tool holder and base station tool holder.
Figure 6:
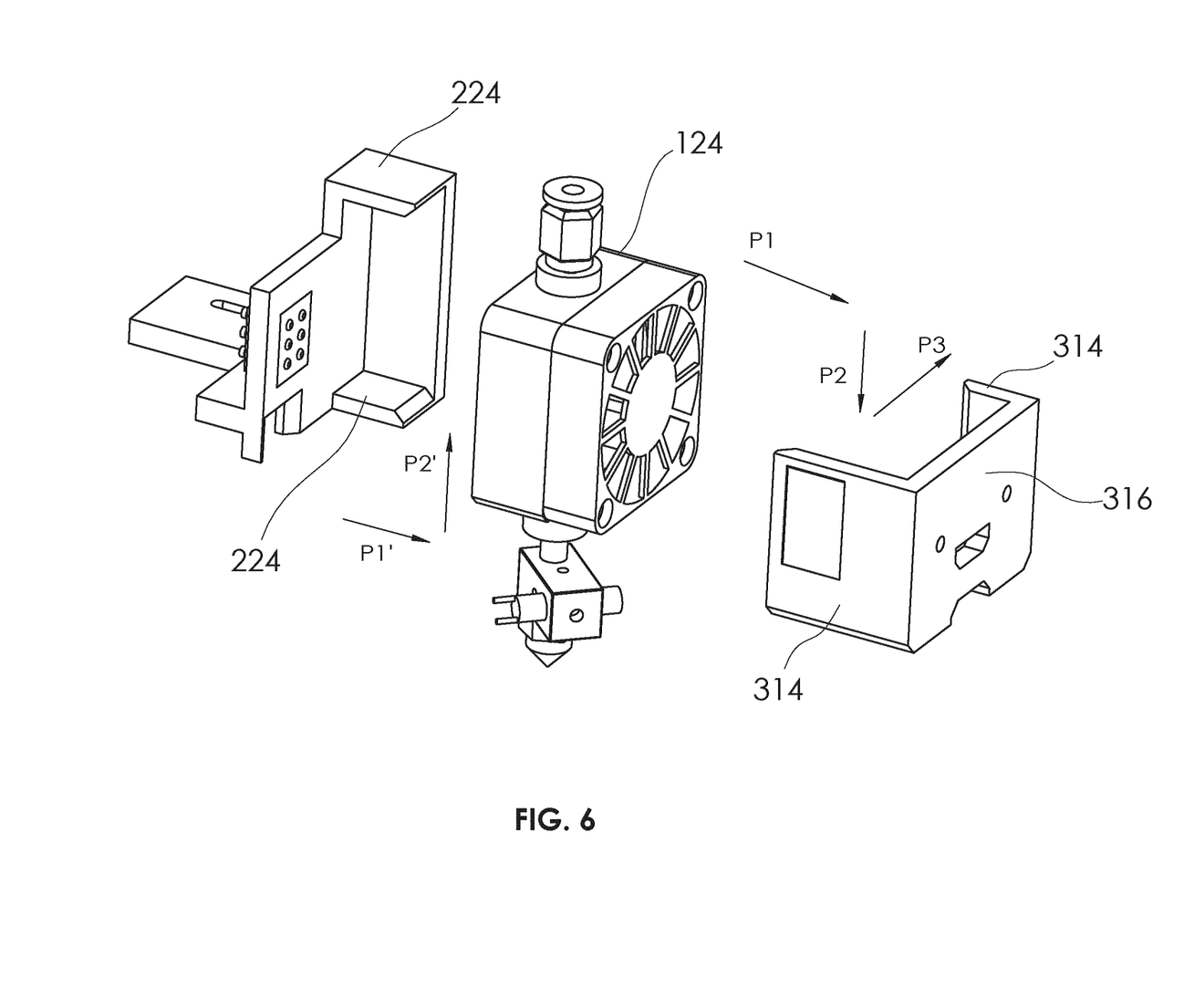
FIG. 6 is another perspective view to illustrate the extruder, the platform tool holder and base station tool holder shown in FIG. 5.

This is illustrated more clearly in FIG. 5 and FIG. 6. To place an extruder 124 into an extruder station tool holder 306, the movable platform or extruder hand 200 may follow a multi-segment path P as indicated in FIG. 5, namely a path formed from first segment $P_1$, second segment $P_2$ and third segment $P_3$ (see also FIG. 6, which indicates these segments $P_1$, $P_2$ and $P_3$ from a different viewing angle). The extruder hand 200 first moves along first segment $P_1$ to move the extruder 124 toward extruder station tool holder 306 until the extruder 124 is seated against the back wall 316 of the extruder station tool holder 306. The extruder 124 is carried by extruder hand 200 and then moved along the segment $P_2$, i.e., downward to ensure good electric contact between the station electric contacts and the tool electric contacts. Finally, the extruder tool holder 204 is moved along segment P₃, to detach the housing 214 of extruder 124 from the claws of the platform tool holder 122 and leave the extruder 124 to remain between the claws of the station tool holder 306. Blocking of the upright wall 314 helps break the magnetic attraction between the magnets of the extruder tool holder 204 and the housing. Similarly, to pick up an extruder 124 from an extruder station tool holder 306, the extruder hand 200 is moved along a second path that comprises a segment P'₁ and segment P'₂. As shown in FIG. 5 and FIG. 6, the extruder hand 200 is first moved along segment P'₁, to seat the housing against the base wall 230 so that the housing is received securely between the upper and lower walls 224. The extruder hand 200 is then moved upwards along segment P'₂ so that the claws 222 lift the housing out of the pair of upright walls 314. In this example, P₃, the direction of removal from the extruder station tool holder 306 (or claws 314) is generally perpendicular to P'₂, the direction of removal from the extruder tool holder 204 (or claws 222). In general, the removal direction defined by the claws of engagement arrangement 212 only need to be non-parallel with the removal direction defined by the claws of second engagement arrangement 312.

Of course, it will be appreciated that although a simple extruder 124 is used in examples to illustrate the tool change, a tool can be a tool assembly having several tools. For example, the same arrangement may be used to select a 3-D printer extruder, or any suitable multi-head 3-D printer extruder assembly, or a multi-tool assembly, such as an extruder and laser tip combination. Additionally, as will be understood, the platform can selectively pick and/or return any tool located at any station tool holder 306. Thus, when the machine is adapted as a 3-D printer, each extruder or extruder assembly will represent one distinct color (or color combination) or a different material (or material mixture). The printer may have therefore as many choices of colored materials or extruding materials as the number of base station tool holders 306 that the base station can accommodate, not limited by availability of space at the moveable platform. This makes the number of available colors or types of materials, or both, the same as the number of station tool holders, and makes the 3-D printer more expandable.

Various embodiments of the invention have now been described in detail. Those skilled in the art will appreciate that numerous modifications, adaptations and variations may be made to the embodiments without departing from the scope of the invention, which is defined by the appended claims. The scope of the claims should be given the broadest interpretation consistent with the description as a whole and not to be limited to these embodiments set forth in the examples or detailed description thereof.

What is claimed is:

1. A machine that manufactures a work item, comprising:
a plurality of tools, each tool of the plurality of tools having a first tool engagement half, a second tool engagement half, and a set of tool electric contacts;
a frame;
a base station supported by the frame, the base station having at least one tool bay, the at least one tool bay having a plurality of station tool holders, each station tool holder of the plurality of station tool holders having a bay engagement half and a set of base electric contacts;
a movable platform supported by the frame, the movable platform having a plurality of platform tool holders, each platform tool holder of the plurality of platform tool holders having a platform engagement half and a set of platform holder electric contacts;
a transport mechanism configured to transport the movable platform relative to the frame and the base station; and
a control system configured to control operation of the transport mechanism such that the movable platform is relocated to a desired location within the frame;
wherein the bay engagement halves are configured for engaging with the first tool engagement halves to releasable store the tools in the base station;
wherein the sets of base electric contacts and the sets of tool electric contacts are configured for forming electrical connections, providing electric power, and pre-heating the tools when the tools are stored in the base station;
wherein the platform engagement halves are configured for engaging with the second tool engagement halves to releasable store the tools in the movable platform;
wherein the sets of platform holder electric contacts and the sets of tool electric contacts are configured for forming electrical connections, providing electric power, and heating the tools when the tools are stored in the movable platform;
wherein tools stored in the base station are selected and transferred from the station tool holders to the movable platform by transporting the movable platform such that the platform engagement halves engage with the second tool engagement halves while the first tool engagement halves are engaged with the bay engagement halves and by transporting the movable platform to disengage the first tool engagement halves from the bay engagement halves;
wherein the transport mechanism is configured to transport the movable platform such that at least one of the tools stored in the movable platform is moved to a desired location within the frame and is used to manufacture the work item;
wherein tools stored in the movable platform are selected and transferred from the movable platform to the base station by transporting the movable platform such that the first tool engagement halves engage with the bay engagement halves while the second tool engagement halves are engaged with the platform engagement halves and by transporting the movable platform laterally to disengage the second tool engagement halves from the platform engagement halves; and
wherein the control system configured to pre-heat, select, transfer, transport, use, and return the tools in an order that optimizes availability and efficiency of the tools.

2. The machine of claim 1, wherein the bay engagement half has a pair of claws.

3. The machine of claim 2, wherein the bay engagement half has a magnet and the first tool engagement half has a complementary magnet so the two magnets engage with each other.

4. The machine of claim 2, wherein the pair of claws defines two walls spaced apart at a distance sized to secure the tool.

5. The machine of claim 1, wherein the transport mechanism includes a first track, a second track, and a third track and is configured to independently transport the movable platform along the first, second and third tracks; wherein any two of the tracks are perpendicular to each other.

6. The machine of claim 1, wherein the tool has an attachment.

7. The machine of claim 1, wherein the tool is an assembly.

8. The machine of claim 1, further comprising a supporting base that can hold the work item; wherein the supporting base is movable relative to the frame.

9. The machine of claim 1, wherein at least one of the plurality of tools is an extruder, drill, engraving tool, cutting tool, liquid dispensing tool, or any combination thereof.

10. The machine of claim 9, wherein at least another tool of the plurality of tools is an extruder and the machine is a 3-D printer.

11. The machine of claim 10, wherein the 3-D printer comprises at least two extruders configured to extrude different materials.

* * * * *